United States Patent Office 3,763,266
Patented Oct. 2, 1973

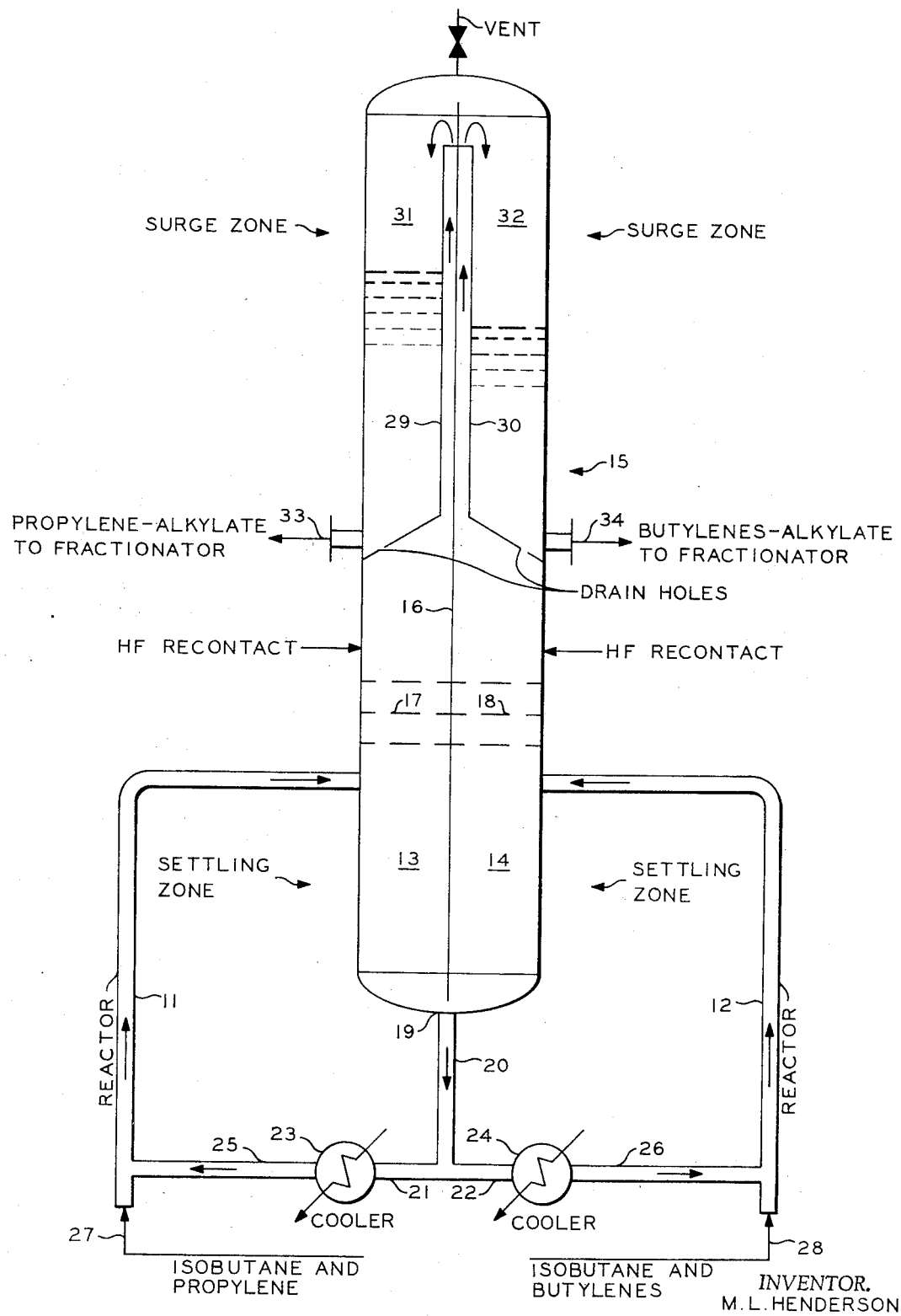

3,763,266
ALKYLATION UTILIZING SURGE CHAMBERS
WITH SETTLING CHAMBERS IN A COMMON
CATALYST SYSTEM
Miles L. Henderson, Bartlesville, Okla., assignor to
Phillips Petroleum Company
Filed Aug. 30, 1971, Ser. No. 175,979
Int. Cl. C07c 3/52
U.S. Cl. 260—683.43                                                           4 Claims

ABSTRACT OF THE DISCLOSURE

A catalyst separator and a method of separating catalysts are provided wherein the product mixture of catalyst and alkylate from two separate alkylation reaction zones using a common catalyst are maintained separately in two liquid full chambers in which catalyst is allowed to settle and is removed from a common outlet with mixing of the catalyst streams and return of the mixed catalyst to separate reaction zones. Liquid alkylate product overflows from the settling zones into separate surge zones so arranged in relation to the settling zones that there is a constant head of liquid in the settling zone overflowing into the separate surge zones. This separation prevents build up of one of the alkylate products in the settler from forcing the alkylate from one chamber into either the catalyst outlet or into the alkylate product in the other chamber of the separator.

BACKGROUND OF THE INVENTION

This invention relates to the separation of catalyst from alkylate products. In one aspect of the invention it relates to catalyst settling tanks. In another aspect of the invention it relates to separating mixed catalyst-alkylate product streams from two separate alkylation reactions into a common catalyst stream and two alkylate product streams without mixing the alkylate products. In still another of its aspects this invention relates to providing a constant liquid head pressure in a liquid full system separating catalyst from the alkylate products of two alkylation reactions in a baffled tank with a common catalyst outlet.

In one concept of the invention it relates to preventing contamination of separated catalyst or alkylate product in a liquid full settling system by providing constant liquid head pressure for alkylate outflow. In another of its concepts this invention relates to providing a constant liquid head pressure on separate alkylate outflow lines by providing overflow into a surge capacity having a liquid level below the outlet of the liquid full alkylate overflow line and a blanket of vapor common to both overflows surrounding the alkylate overflow lines.

It is the usual practice to alkylate an isoparaffin with two different olefins in separate reactors and to pass the individual alkylate product streams to separate acid settlers for separation of the catalyst from the product stream. It is also a practice to alkylate an isoparaffin with two different olefins in separate alkylators and pass the individual alkylate streams to a common settler provided with a partition spaced from the top and bottom of the separator, thereby allowing communication between the separate sections of the settler for a common vapor cushion above the liquids and for a common catalyst outlet. The common settler can also have a partition all the way to the top of the vessel and be operated liquid full. In the systems using a common catalyst outlet the acid catalyst is combined into a single stream for return to the respective alkylators. By such methods of operation using a common catalyst outlet as described above, surges of one of the alkylate product-catalyst streams can force the surging alkylate into the catalyst outlet or into the alkylate product on the other side of the baffle causing undesirable contamination of catalyst or alkylate product.

In accordance with this invention, to produce an alkylate product of higher quality, a catalyst settler with a common catalyst outlet is operated with the chambers into which separate alkylate product-catalyst streams are fed being run liquid full with separate alkylate outlets discharging into separate surge zones served by a common vapor space with the liquid level in the surge zones maintained below the level of the outlet from the settling zones.

Accordingly, an object of this invention is to provide an improved process and apparatus for simultaneously separating a common catalyst from the alkylation product-catalyst mixture of two separate alkylation reactions.

Another object of this invention is to provide an improved process and apparatus for separating two unlike alkylation products from a common catalyst employing a multi-component vessel having a common catalyst discharge and separate discharge for the unlike alkylate streams. It is a further object of this invention to provide an improved process and apparatus for effecting the separation of a catalyst from unlike alkylate products maintaining a constant liquid head pressure in the liquid full catalyst settling compartments.

Other objects and aspects as well as the several advantages of this invention will become apparent upon consideration of the accompanying disclosure, the drawing and the appended claims.

SUMMARY OF THE INVENTION

In accordance with the invention, a process and apparatus are provided wherein mixed catalyst and alkylate streams from two separate alkylation reaction zones are maintained separately in two liquid full chambers in which the catalyst common to the two alkylation reactions is settled and removed from an outlet common to the liquid full chambers with mixing of the catalyst streams and return of the catalyst to separate reaction zones and wherein liquid alkylate product overflows from the settling zones into separate alkylate surge zones so arranged in relation to the settling zones that there is a constant head of liquid in the settling zones overflowing into the separate surge zones.

In one embodiment of the invention the separate alkylate streams are passed from the settling zone through elongated risers to a position near the top of separate surge zones. The alkylate streams overflow from the risers to fill the surge zones to a level controlled to be below the point of discharge from the riser.

DESCRIPTION OF THE PREFERRED EMBODIMENTS

The common alkylate-acid settler of the invention comprises in the preferred embodiment a vertical vessel provided with an upright baffle extending from near the top wall to substantially the bottom wall, but spaced from the top wall to allow communication of a vapor space between the two separate chambers. The upright baffle is spaced from the bottom wall to allow communication between the settled catalyst phases in the bottom of the two compartments. The tank is further divided by a horizontal baffle which in conjunction with the vertical baffle forms four separate compartments within the tank. The two lower compartments serve as catalyst settling zones with the feedpoint for a mixture of catalyst and alkylation product located about half way the vertical dimension of the zone. The settling compartments can contain perforated baffles above the feedpoint which serve the purpose of impeding the progress of the heavier phase, the catalyst, increasing the tendency of this phase to settle toward the bottom of the settling zone. The settling zone is operated liquid full so that separated alkylate liquid overflows from the top of the settling zone into one of the two separate surge zone chambers occupying the upper portion of the vertical tank. In the preferred embodiment elongated risers carry separate streams of alkylate to a position near the top of the separate surge zones. The alkylate liquid overflows into the surge area where the level of alkylate liquid is maintained at a height below the point of overflow so that there is a constant liquid head in the settling portion of the tank.

Other tankage configurations can be used by the process of this invention as long as the alkylate reaction product-catalyst mixtures are fed into two separate settling chambers having a common catalyst outlet and the alkylate reaction product overflows into separate surge zones with the liquid level in the surge zones held below the point of overflow from the liquid full settling zones.

The preferred olefins in the process are propylene and butylenes, but any $C_3$ to $C_7$ olefins can be used. Isobutane is preferred as the isoparaffin in this process, but $C_4$ to $C_8$ isoparaffins can be used.

The process is operable with the fluid alkylation catalysts known in the art as long as there is a sufficient density difference between the catalyst and the alkylate product formed so that the catalyst will settle from a stream containing both the catalyst and the alkylate product. The process can be used with either fluid acid catalyst or metal chloride slurry catalyst.

A better understanding of the invention will be obtained by reference to the accompanying schematic drawing showing an arrangement of apparatus illustrating the preferred embodiment of the invention.

Referring to the drawing, a pair of alkylators 11 and 12 are connected to deliver a catalyst-alkylate product mixture into settling zones 13 and 14 of catalyst separation tank 15.

In a typical reaction system isobutane-propylene feedstock and isobutane-butylenes feedstock are alkylated under the following conditions:

Reactor conditions

Isobutane-propylene alkylator:
 Temperature, °F. _____ 96
 HF/total hydrocarbon vol. ratio _____ 4
 IC$_4$/Olefin mol. ratio _____ 13
 Pressure, p.s.i.g. _____ 120
Isobutane-butylenes alkylator:
 Temperature, °F. _____ 95
 HF/total hydrocarbon vol. ratio _____ 4
 IC$_4$/olefin mol. ratio _____ 13
 Pressure, p.s.i.g. _____ 120

These feedstocks, which are fed to the separate reactors at a rate of 1.25 barrels of isobutane-propylene feed per barrel of isobutane-butylene feed have the following compositions :

Isobutane-propylene: Volume percent
 Propane _____ 7
 Propylene _____ 6
 Isobutane* _____ 81
 Normal butane _____ 6
Isobutane-butylenes:
 Propane _____ 3
 Isobutane* _____ 83
 Butenes _____ 6
 Normal butane _____ 8

*Includes recycle isobutane.

A baffle 16 divides the tank into the separate settling zones. Perforated baffles 17 and 18 above the inlet lines aid in separating the mixture. The catalyst drops to the bottom of the tank where catalyst from the two setling chambers 13 and 14 are mixed at 19 and are withdrawn from the tank through line 20 at a rate of about 9 barrels per barrel of isobutane-butylene reactor feed and divided into two separate streams 21 and 22 proportioned to the reactor feed. The catalyst from line 21 is passed through a cooler 23 through another line 25 to be mixed with isobutane and propylene feed fed through line 27 into the reaction zone 11. The other part of the catalyst is fed through line 22 and acid cooler 24 and line 26 to be mixed with isobutane and butylene feed from line 28 in the reaction zone 12.

Alkylate product rises to the top of the settling tank and overflows through riser pipes 29 and 30 at a rate of about .14 barrel of propylene alkylate per barrel of isobutane-butylene feed and about .11 barrel of butylene alkylate per barrel of isobutane-butylene feed into surge compartments 31 and 32 which are separated by baffle 16. Baffle 16 extends above the top of the risers 29 and 30 but does not reach the top of tank 15 so that a common vapor space 31 serves both surge chambers. Sufficient alkylate product is withdrawn from the surge zones 31 and 32 through lines 33 and 34 so that the levels in the surge zones do not reach the height of the overflow from the settling zones.

Reasonable variation and modification are possible within the scope of the foregoing disclosure, the drawing and the appended claims to the invention the essence of which is that a method and apparatus are provided which allow in a single vessel catalyst to be separated from the alkylate product of two separate reactions while maintaining a constant head pressure on the alkylate product outlets which are maintained separately from the separation zone while mixing the catalyst at the vessel outlet for return to the reactors.

I claim:

1. In a process for producing two different alkylation products utilizing a common catalyst system in which different reactants are contacted with a fluid catalyst in separate reactors to produce two separate reaction streams, each of said streams comprising a mixture of alkylation product and catalyst, and continuously introducing said separate streams into a liquid full settler which is divided into two separate chambers so that each of said streams settles separately into an acid phase and an alkylation product phase, said settler having a common outlet means at the bottom thereof so that catalyst settling in the two separate chambers is passed out through said means and returned through separate lines to the separate reactors, the improvement comprising:
 (a) passing said mixture through an overhead overflow from each of said chambers into separate liquid surge chambers, said settling chambers and said surge chambers having a common vapor space overhead, and
 (b) removing alkylation product streams from each of said surge chambers at a rate that prevents liquid alkylation product in each of said surge chambers from increasing to a height above said overhead overflow.

2. The process of claim 1 wherein the fluid catalyst is chosen from a liquid acid alkylation catalyst and a metal chloride slurry alkylation catalyst.

3. The process of claim 1 wherein the reacting raw materials are chosen from $C_3$ to $C_7$ olefins and $C_4$ to $C_8$ isoparaffins.

4. The process of claim 3 wherein the olefins are propylene and butylenes and the isoparaffin is isobutane.

References Cited

UNITED STATES PATENTS

| 3,544,651 | 12/1970 | Chapman | 260—683.48 |
| 3,158,661 | 11/1964 | Plaster et al. | 260—683.48 |
| 3,213,157 | 10/1965 | Hays et al. | 260—683.48 |
| 3,108,048 | 10/1963 | McDonald | 260—683.48 |

HERBERT LEVINE, Primary Examiner

G. J. CRASANAKIS, Assistant Examiner

U.S. Cl. X.R.

260—683.47, 683.58